Oct. 9, 1956  L. J. REVALLIER ET AL  2,765,867
METHOD OF SEPARATING DISPERSED GAS FROM A LIQUID
Filed June 17, 1953  2 Sheets-Sheet 1

Inventors
Leonardus J. Revallier
Cornelis Dijksman
By Cushman, Darby & Cushman
Attorneys Oct. 9, 1956   L. J. REVALLIER ET AL   2,765,867
METHOD OF SEPARATING DISPERSED GAS FROM A LIQUID
Filed June 17, 1953   2 Sheets-Sheet 2

Inventors
Leonardus J. Revallier and
Cornelis Dijksman
By Cushman, Darby & Cushman
Attorneys

United States Patent Office 2,765,867
Patented Oct. 9, 1956

2,765,867

METHOD OF SEPARATING DISPERSED GAS FROM A LIQUID

Leonardus J. Revallier, Geleen, and Cornelis Dijksman, Heerlen, Netherlands, assignors to Stamicarbon N. V., Heerlen, Netherlands Application June 17, 1953, Serial No. 362,306

Claims priority, application Netherlands June 19, 1952

2 Claims. (Cl. 183—2.5)

Our invention relates to a method of and an apparatus for separating dispersed gas from a liquid so as to obtain a liquid which is practically free of gas bubbles.

The removal of dispersed gas from liquids is usually carried out with the help of gravity, by leaving the liquid to stand in large tanks, while, if necessary, a depression is created over the liquid. With frothing liquids a layer of froth which varies in thickness according to the nature of the liquid, is formed, which, if the froth is very stable, must be separated off and subsequently broken. It is already known to use rotary centrifuges for the separation of dispersed gas, instead of carrying out the separation by gravity, but the employment of these centrifuges is rather costly.

It is the main object of our invention to provide a method of separating dispersed gas from a liquid by which an adequate removal of dispersed gas may be effected in a rapid and efficient manner.

A further object of our invention is to provide such method in which no use is made of moving mechanical parts.

Another object of our invention is to provide such method which is particularly adapted to separate dispersed gas from strongly frothing liquids.

A still further object of our invention is to provide simple and efficient apparatus for carrying out our new method.

Further objects will appear hereinafter and in the claims hereof.

According to our invention there is provided a method of separating dispersed gas from a liquid wherein the liquid containing the dispersed gas is brought into rapid rotation in a cylindrical rotation chamber as herein defined, the rate of feed of the liquid and the dimensions of the chamber being such that gas is separated from dispersion under the influence of the centrifugal forces in the liquid and is discharged through the central discharge aperture of the chamber and the liquid from which such gas has been removed is discharged at or near the periphery of the chamber.

The expression "a cylindrical rotation chamber" as used herein and in the claims hereof designates a cylindrical chamber which at or near one of its ends is provided with a feed passage or passages arranged so that liquid forced therethrough at a suitable rate, is brought into a rapid rotary motion in the chamber, the chamber having a central discharge aperture for the gas in one of its ends and one or more discharge apertures for the liquid arranged at or near the end of the chamber remote from the feed passage(s) in such a manner that the mean radius at which liquid may discharge is about equal to the mean radius at which liquid can be fed into the chamber.

Preferably the feed passage(s) and liquid discharge aperture(s) are arranged so that the feed and discharge from the chamber take place tangentially. However the feed may take place in an axial direction, e. g. through an annular channel provided with guide vanes which start the liquid rotating in the chamber. Likewise, the discharge of the liquid may take place through an annular channel, whether or not provided with guide vanes.

When the liquid with the gas dispersed therein is forced continuously through such a rotation chamber of suitable dimensions so that a rapidly rotating liquid cylinder is created therein, then at a suitable pressure drop across the chamber, the dispersed gas bubbles are forced towards the axis of the chamber by the centrifugal forces generated. The liquid freed of dispersed gas then escapes through the discharge aperture(s) at or near one end of the chamber and the gas, possibly in the form of a froth, escapes through the central discharge aperture.

Now the best results have been obtained if the central discharge aperture is positioned at the same end of the rotation chamber as the feed passage(s). The orientation of the rotation chamber in use is not important.

The pressure drop across the rotation chamber, which is necessary to attain a sufficiently high rotational velocity for removing the dispersed gas, depends on the specific gravity and viscosity of the liquid and on the dimensions of the rotation chamber.

As regards the liquid, the lower its specific gravity or the higher its viscosity, the higher is the rotational velocity and hence the greater is the pressure drop which are necessary in a given rotation chamber for removing dispersed gas bubbles.

As regards the dimensions of the rotation chamber, a higher feed velocity and hence a greater pressure drop across the rotation chamber is necessary for achieving a given separation, the larger the diameter of the chamber. Accordingly it may be advantageous to avoid using a larger rotation chamber but to realize any desired capacity by employing a suitable number of small rotation chambers connected for operation in parallel.

The diameter of the central discharge aperture should be chosen so small that liquid will just be prevented from escaping through this central aperture.

The degree of separation of the dispersed gas depends on the time during which the liquid is exposed to the centrifugal forces, and the length of the rotation chamber will be chosen accordingly. The maximum length permissible is limited by the necessity to maintain a certain rotational velocity of the liquid even at the end of the chamber remote from the feed, and in view of the fact that the rotational velocity decreases along the chamber from the feed end thereof as a result of frictional contact of the liquid with the wall of the chamber.

Complete separation of the dispersed gas, if not effected by a treatment in a single rotation chamber or group of rotation chambers operating in parallel, may be effected by successive treatments of the liquid by passing the same through several rotation chambers or groups of rotation chambers arranged in series. It has been found that the pressure drop needed across each rotation chamber of such a series, when employed for a given separation, is considerably less than is needed in the case of a single chamber or group of chambers in parallel for effecting the same separation.

If the gas leaves the central discharge aperture of the chamber together with some liquid, in the form of a froth or foam, the latter may be broken, if necessary, for which purpose any suitable method may be employed. For example, the froth may be drawn through a fan so as to be broken up by the fan blades.

Preferably, however, the froth is broken in the manner described and claimed in the copending Revallier application Ser. No. 362,305, filed June 17, 1953, by introducing the froth into the core of a vortex generated in an auxiliary gas by feeding this gas continuously into a radially symmetrical chamber with a single, axially located, discharge aperture in one end thereof so that the gas commences to rotate in the chamber in a path of greater radius than the radius of the said discharge aperture.

Our invention, by way of illustration and not of limitation, will be further explained with the help of the accompanying diagrammatic drawings and an example.

Referring to the drawings.

Figure 1:
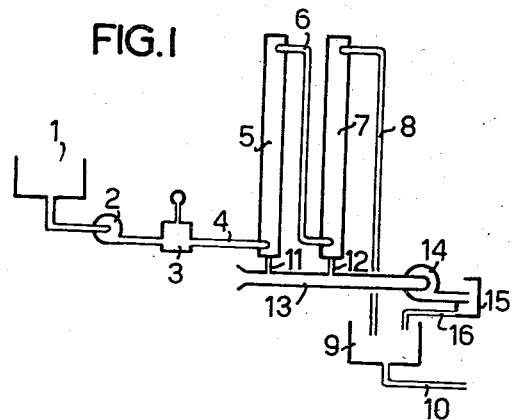
Figure 1 is a diagram of an assembly for carrying out the method according to our invention.

In Figure 1, 1 is a pump cistern for feeding the liquid containing dispersed gas to pump 2. Pump 2 forces the liquid into the cylindrical rotation chamber 5, via a buffer tank 3, through a tangential feed conduit 4. The liquid leaves the rotation chamber 5 via a tangential discharge conduit 6, which likewise leads tangentially, into a second rotation chamber 7, provided with a tangential discharge conduit 8 for the liquid. Subsequently the liquid, freed of dispersed gas, is passed into a following apparatus (not shown) via a buffer tank 9 and a discharge conduit 10. Gas removed from dispersion leaves the rotation chambers, together with some liquid, in the form of a froth or foam, through the froth conduits 11 and 12 which lead from the central discharge apertures of the rotation chambers to the suction pipe 13 of a fan 14. The froth is sucked along pipe 13 and is broken in the fan. The resulting liquid discharges against wall 15 after which it is led into buffer tank 9 via a conduit 16.

In this embodiment two rotation chamber separators, viz. 5 and 7, connected in series, are employed. But unless the dispersed gas is particularly difficult to separate off it is usually found to be possible to effect the separation in a single stage.

Figure 2:
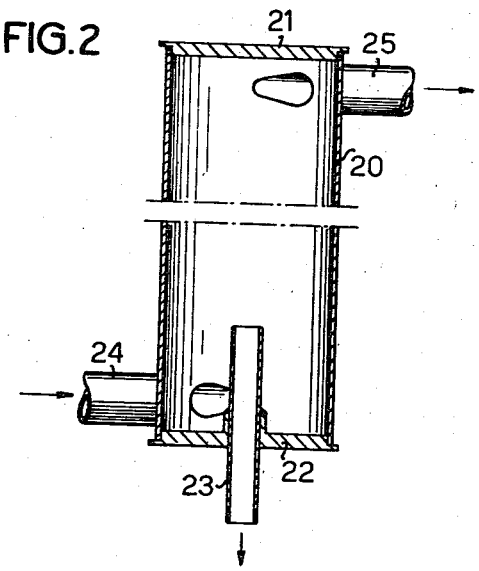
Figure 2 is a broken longitudinal cross section of a rotation chamber according to our invention.

Referring now to Figure 2 showing in more detail a rotation chamber separator suitable for carrying out the present method, the chamber comprises a cylindrical tube 20, the length of which is preferably from three to seven times its diameter, which tube is closed at the upper and lower ends by covers 21 and 22 respectively. In cover 22 a central conduit 23 is provided for the discharge of the gas or the froth separated off. The chamber is further provided with a tangential feed conduit 24 for the material to be treated and a tangential discharge conduit 25 for the discharge of liquid.

*Example*

Strongly frothing potato starch water, as it came from the screening stations of starch recovery apparatus, was passed under a pressure drop of 0.7 atm. gauge pressure through a rotation chamber as shown in Figure 2, having a diameter of 50 mm., a length of 250 mm., tangential feed and discharge conduits of 15 mm. diameter and a central froth discharge conduit of 7 mm. diameter. The gas dispersed in the water was separated from dispersion in the chamber and discharged through the central discharge conduit, together with some liquid, in the form of a froth having the consistency of whipped cream. The liquid discharged through the tangential discharge conduit was practically free of froth or dispersed gas. The capacity of the separator was 3.6 m.³ of liquid per hour.

An even better result was obtained by using two rotation chambers as shown in Figure 2 connected in series and passing the potato starch water through the two chambers at the same gauge pressure of 0.7 atm.

It was found that for breaking the resulting froth in the manner described with reference to Figure 1, a fan with a capacity about 15 times the rate of supply of the liquid (measured, e. g. in m.³ per hour) had to be employed.

In cases where the liquid from which dispersed gas is to be removed produces no froth, the use of a froth breaker will be dispensed with, as the discharge through the central discharge aperture will then consist entirely of gas.

Figure 3:
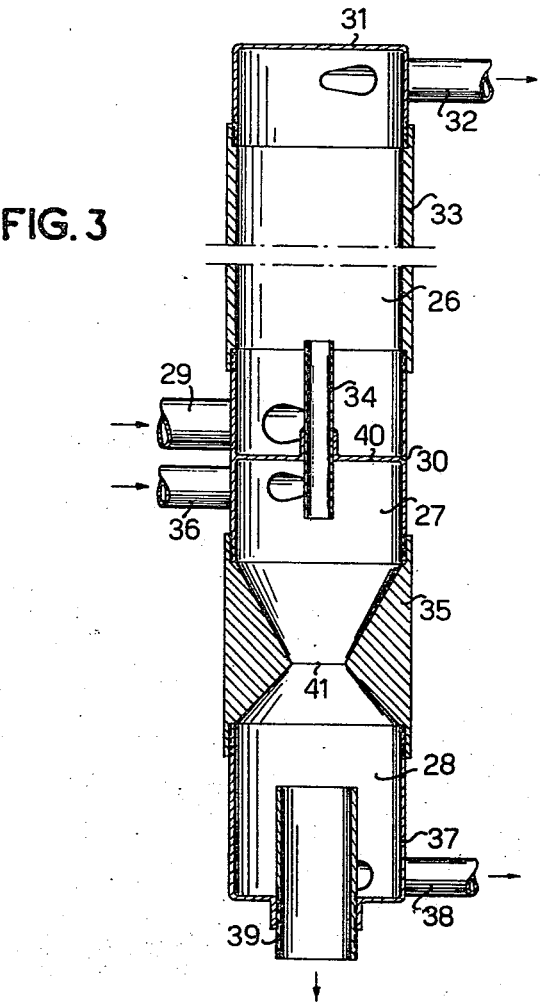
Figure 3 is a longitudinal cross-section of a preferred form of combined apparatus for separating dispersed gas from a liquid and subsequently breaking the resulting froth.

The apparatus shown in Figure 3 comprises a rotation chamber suitable for carrying out the present method, coupled with apparatus as described and claimed in the aforesaid copending Revallier application Ser. No. 363,305 for breaking froth and separating the resulting liquid and gas by the method described and claimed in that application. The apparatus has the external form of a long tube with four tangential conduits 32, 29, 36 and 38 and a central discharge conduit 39.

The apparatus comprises a rotation chamber separator 26 for carrying out the present method, a froth breaker 27 and a collecting chamber 28.

The separator 26 is constituted by a cylindrical tube 33, to one end of which is screwed the part 30 and to the other end of which is screwed the cap 31. The cap 31 is provided with a tangential outlet pipe 32. The part 30 contains a partition wall 40, which separates the separator 26 from the froth breaker 27. This partition wall carries the pipe 34, which forms the central discharge conduit of separator 26 and a central feed pipe to the froth breaker 27. The tangential feed conduits, 29 and 36, lead into the part 30 in the same direction, one on each side of the partition wall 40. Conduit 29 constitutes the liquid feed passage to separator 26 and conduit 36 constitutes the feed passage for auxiliary gas to the froth breaker 27.

The froth breaker 27 is formed by the combination of part 30 and part 35 which parts are screwed together. In part 35 a central discharge aperture 41 for the froth breaker 27 is formed. This aperture leads into collecting chamber 28, which is formed by the combination of parts 35 and 37 which are screwed together. Part 37 is provided with a tangential discharge conduit 38 for liquid and a central discharge conduit 39 for gas.

If now a frothing liquid, e. g. potato starch water containing dispersed gas, is forced under pressure through conduit 29, this liquid traverses the separator 26 in rapid rotation and discharges therefrom through tangential discharge conduit 32. Gas is forced towards the axis of the separator and discharges with some liquid, in the form of a froth, through pipe 34 into the froth breaker. If an auxiliary gas, e. g. air, is blown at a suitable velocity through the feed conduit 36 so as to form a gas vortex in the chamber 27, the froth from chamber 26 enters the core of this vortex and is subsequently broken down by the forces in the vortex, the liquid from the froth being precipitated on the wall of chamber 27 and flowing along the said wall to discharge through aperture 41. On reaching this aperture the liquid is blown into collecting chamber 28 and onto the peripheral wall thereof by the rapidly rotating gas which is itself discharging through aperture 41, after which the liquid is discharged through tangential conduit 38. The gas entering chamber 28 is forced to leave the apparatus through the central discharge conduit 39. As at the small radius of this discharge conduit the rotational velocity of the gas is rather high, any sprayed drops of liquid are flung out as a result of the rotation and are not entrained through conduit 39 by the gas.

We claim:

1. Apparatus for separating dispersed gas from a liquid comprising, a cylindrical rotation chamber, at least one liquid feed conduit discharging tangentially into said chamber near one end thereof, a discharge conduit communicating peripherally with said rotation chamber near the other end thereof, and a froth discharge conduit projecting axially into the infeed end of said rotation chamber, a second radially symmetrical rotation chamber coaxially aligned with said first-mentioned rotation chamber, a circular axial discharge aperture in said second chamber, at least one feed conduit for an auxiliary gas discharging tangentially into said second chamber on a radius exceeding the radius of the discharge aperture thereof, and a froth feed conduit discharging axially into said second chamber, opposite the discharge aperture thereof, the outlet diameter of said froth feed conduit being less than the diameter of said discharge aperture, said froth feed conduit constituting an extension of the froth discharge conduit of said first-mentioned rotation chamber, and a radially symmetrical receiving vessel joined coaxially to said second rotation chamber and enclosing the discharge aperture thereof, said receiving vessel being provided with a gas discharge conduit projecting axially thereinto opposite the discharge opening of said second rotation chamber.

2. Apparatus according to claim 1, wherein said receiving vessel is provided with a peripherally disposed discharge aperture for the liquid separated from said froth.

References Cited in the file of this patent

UNITED STATES PATENTS

| | | |
|---|---|---|
| 1,440,808 | Wineman | Jan. 2, 1923 |
| 1,734,507 | Westling et al. | Nov. 5, 1929 |
| 1,737,680 | Pinkham | Dec. 3, 1929 |
| 1,847,648 | Harkom | Mar. 1, 1932 |
| 2,252,581 | Saint-Jacques | Aug. 12, 1941 |
| 2,353,833 | Kimmell | July 18, 1944 |
| 2,405,138 | Gates | Aug. 6, 1946 |
| 2,434,596 | Spieth | Jan. 13, 1948 |
| 2,590,754 | Cline | Mar. 25, 1952 |

FOREIGN PATENTS

| | | |
|---|---|---|
| 84,052 | Sweden | Aug. 13, 1935 |
| 104,183 | Great Britain | Feb. 15, 1918 |
| 810,110 | France | Dec. 19, 1936 |